Jan. 6, 1970     V. D. MOLITOR     3,487,677
METHOD FOR LEAK DETECTION
Filed Jan. 8, 1968
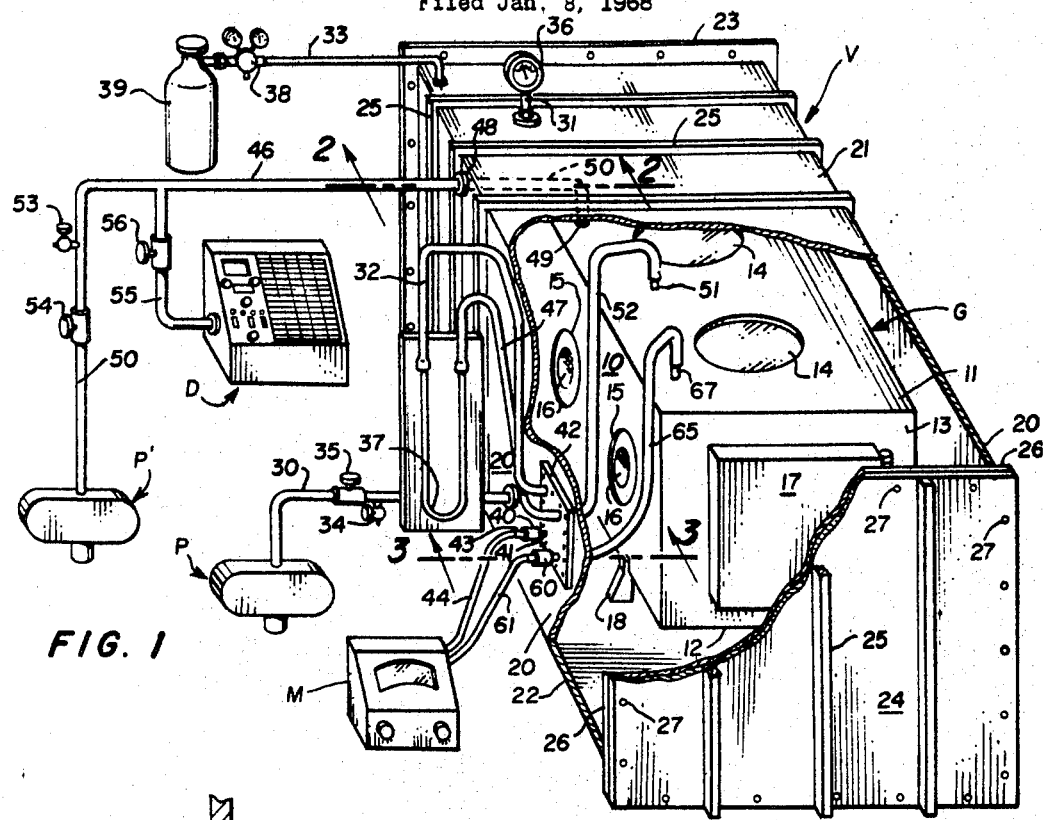
FIG. 1
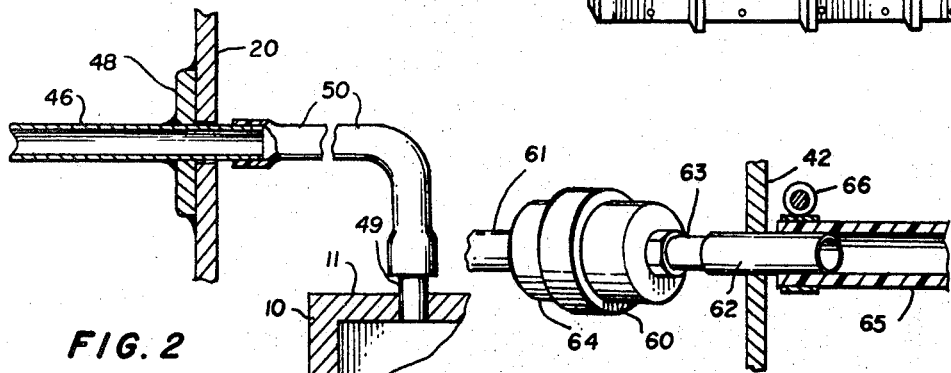
FIG. 2     FIG. 3
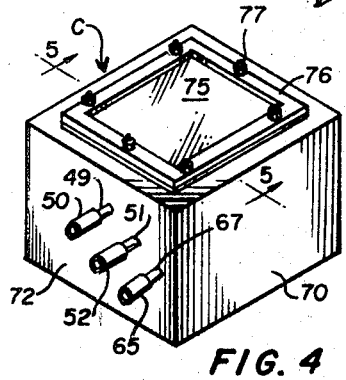 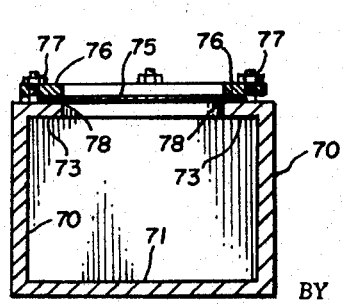
FIG. 4     FIG. 5
INVENTOR.
*Victor D. Molitor*
BY
*Van Valkenburgh Lowe*
ATTORNEYS

United States Patent Office 3,487,677
Patented Jan. 6, 1970

3,487,677
METHOD FOR LEAK DETECTION
Victor D. Molitor, 2829 S. Santa Fe Drive,
Englewood, Colo. 80110
Filed Jan. 8, 1968, Ser. No. 696,266
Int. Cl. G01m 3/04
U.S. Cl. 73—40.7                                    13 Claims

ABSTRACT OF THE DISCLOSURE

A method for testing a thin walled or similar container for total leakage, including diffusion through the walls or gasket material, as well as through leaks, joints or the like, or a wall portion. The container is preferably thoroughly cleaned, then placed within a heavier walled closed vessel and the vessel and the container are evacuated simultaneously while maintaining a small difference in pressure between the two, within the limits of damage to the thin walled container or wall portion, such as on the order of two or three inches of water or less. Then, a small amount of a detector fluid, such as helium or other gas, moisture or other vapor, is released into the vessel outside the container, or inside the container, until the pressure differential between the inside and the outside of the container is a selected measurable value, but within the limits of damage to the container or a wall portion thereof. Thereafter, any leak of detector fluid from outside the container to the inside, or vice versa, may be detected by an instrument such as a mass spectrometer. The method is useful for testing for leakage of containers in which various operations are to be carried out in a specific type of atmosphere, at relatively low difference in pressure between the inside and outside, as well as to determine permeability or fluid diffusion rates through a specific material forming a predetermined area of one or more walls of the container.

A similar method may be used to test for outgassing or deterioration of material, particularly in a very high or ultra high vacuum.

METHOD FOR LEAK DETECTION

This invention relates to methods for leak detection and permability determination, and more particularly to methods for the detection of leaks in containers whereby the total leak rate of a cotnainer can be measured and a corresponding method for permeability determination.

The invention is especially adapted to check leaks in containers of the type commonly referred to as "glove boxes." A glove box container, used for scientific or production purposes, may be of a comparatively elaborate construction having window openings and other openings which are sealed by resilient diaphragms with glove configurations formed in them to permit a technician to place his hands into the glove configurations and reach into the container. Other types of containers which must also be absolutely vapor tight and leakproof are for the storage of items which are easily perishable by the action of air and for certain types of volatile liquids.

Various methods for testing containers to detect leaks, and especially methods to detect minute leaks, have been developed. One type of test is to evacuate the container and thereafter measure the resulting rise in pressure, continuing the test for several weeks or months, if necessary. A refinement in such a test procedure resides in immersing the container in a detector gas which is more suitable for conducting such a test than would be the atmosphere, helium being one gas often used for the purpose, because of the very low percentage thereof in the atmosphere. The container is placed within a closed vessel or in a flexible envelope wherein the helium gas is retained. The container is then evacuated and leakage of helium, if any, into the evacuated container may be detected with a mass spectrometer or a similar instrument. Such a testing procedure may also be reversed, the container being filled with the detector gas, such as helium. It is then placed in a vessel, as in the so-called bell jar test, and the vessel is evacuated so that any leakage of the detector gas from the container and into the vessel may be detected. The vacuum to which the vessel is subjected, in order to remove all trace, if possible, of air or other gases, vapors or the like, is necessarily as high as possible, such as less than one millitorr, e.g. $10^{-3}$ torr or even less, such as less than one microtorr, e.g. $10^{-6}$ torr and as low as $10^{-8}$ or $10^{-9}$ torr. The torr is a suggested international standard term to replace the term millimeter of mercury and its abbreviation mm. of Hg, being 1/760 of a standard atmosphere and differing by only one part in seven million from the standard millimeter of mercury.

Other methods of leak detection include the sniffer or probe test, in which the container to be tested is evacuated and a probe or nozzle discharging a detector gas, such as helium, is moved slowly over the areas, such as joints, gaskets, welds and the like, at which leakage might be expected, so that the position of a leak indicated by the leak detector may be ascertained. After the leak is repaired, the container is again tested, primarly over the area or areas in which a leak or leaks were previously detected.

It is quite apparanet that such conventional procedures for leak detection are suitable only for containers which are sufficiently heavy and strong to permit them to withstand the pressures which occur when they are evacuated or placed in a high vacuum. Such methods cannot be used for a container formed as a comparatively thin walled, box-like structure, incapable of withstanding any substantial pressure differential between the inside and outside of the container which could collapse, distort, or rupture the container walls.

There also exists a need for measurement of the permeability or fluid diffusion rates of many materials, particularly those having insufficient strentgh to withstand a pressure differential of any appreciable extent, such as metal foil, various types of plastic, and the like, as well as the permeability or diffusion rates of various types of materials when subjected to different gases or vapors. The latter include oxygen, water vapor, metal vapor, halides, hydrocarbons and numerous others. For instance, boxes to contain plutonium rods must have a minimum permeability to oxygen and water vapor, each of which causes degradation of the plutonium. Also, for space travel purposes, it is desirable to know the diffusion rate or permeability of various materials to metal vapors and the like.

The present invention was conceived and developed to provide an improved method for leak detection for such lightweight containers or portions thereof which are incapable of withstanding substantial pressure differentials between their interior and exterior surfaces. The invention comprises, in essence, a method for leak detection or permeability determination, wherein the container to be tested is preferably first thoroughly cleaned, then placed within a test vessel of a type which may be fully evacuated. The steps of the process include simultaneously evacuating both the test vessel and the container within it, while maintaining the pressure differential between the vessel and the container to a value less than that which would damage the container. After the vessel has been brought down to an absolute pressure of less than the damaging pressure, both the vessel and the container are further evacuated until the vessel is brought to a pressure of such as less than 10 microns of mercury of $10^{-3}$ torr, and the container to the desired detection pressure, such as $10^{-6}$ to $10^{-9}$ torr. Thereafter, the vacuum within the vessel, but not within the container, is partially relieved by introducing a detector fluid into the vessel, but not into the container. This produces a small, selected pressure differential between the inside and outside of the container which is less than that which can be withstood by the container. Such pressure differential, insufficient to distort the container, will nevertheless, in the evacuated environment, produce a substantial flow of detector fluid into the container from any leak which may exist. The presence of such a leak may be detected and measured by an instrument, such as a mass spectrometer, or other suitable type of gas analyzer. It will be noted that, for an otherwise tight vessel, the leak rate may be an indication of gas diffusion through the gasket or other material of which the vessel is formed. Thus, one or more wall portions of a vessel previously tested and found to have a satisfactory lack of total leakage, may be replaced by a section of material, such as metal foil, plastic, paper, or others, of predetermined area, to simplify determination of the permeability or diffusion rate per unit of area. Then, the above steps are repeated to ascertain the difference in total leakage, if any, produced by the substitution of material. The detector fluid may be varied as desired and thus may be one which, if diffusing through the material, might produce deleterious results in the use to which the material is to be put.

One of the purposes for which the interior of the container is reduced to a relatively high vacuum is to eliminate all extraneous gases or liquids which might interfere with the test, so that all contaminant gases, vapors or liquids will be removed, as far as possible, before the test is begun. Another reason for the relatively high vacuum is that a mass spectrometer, for instance, itself operates effectively at a relatively high vacuum, such as less than $10^{-3}$ torr.

If follows that the objects of the present invention are to provide a novel and improved method of leak detection or permeability measurement, which can be used for lightweight containers or thin materials that are not intended to be subjected to any large inside-outside pressure differentials; is a highly sensitive and accurate procedure and suitable for the detection of minute leaks or diffusion rates; permits the leak test to proceed in the ideal environment of a vacuum; will use standard equipment and conventional test operations with only a minimum of alteration and change of available equipment; and is a quick, low cost, versatile and reliable procedure.

With the foregoing and other objects in view, as will be hereinafter set forth, my invention comprises a certain arrangements, steps and procedures, all as hereinafter described in detail and defined in the appended claims, and with apparatus useful for the same being diagrammatically illustrated in the accompanying drawings, in which:

FIG. 1 is a perspective view of a glove box mounted within a test vessel, with portions of the vessel being broken away to show the glove box within it and with other portions of components hidden from view being shown in broken lines, the view illustrating further, in a somewhat diagrammatic manner, the apparatus and instruments used in performing the test.

FIG. 2 is a fragmentary, sectional detail of the connection of a lead from the glove box, through the vessel and to the exterior of the vessel, as taken along line 2—2 of FIG. 1, but one an enlarged scale.

FIG. 3 is a fragmentary, perspective, sectional detail of one mode for bringing another lead through the wall of the vessel and glove box, as taken along line 3—3 of FIG. 2, but on an enlarged scale.

FIG. 4 is a perspective view, on a reduced scale, of a container adapted to be placed within the larger vessel of FIG. 1 but one wall of which is provided with a section of material to be tested for permeability or diffusion rate.

FIG. 5 is a vertical section taken along line 5—5 of FIG. 4, on a slightly enlarged scale.

Referring more particularly to the drawings, the arrangement is illustrative of that required to provide a leak test for a glove box G. This glove box is representative of a typical container which may be required for purposes where leaks into it cannot be permitted. This glove box G may be formed in any suitable shape, such as a cylinder or as a rectangular box as illustrated, having sides 10, a top 11, a bottom 12 and ends 13. A glove box will ordinarily include glass closed ports 14 for viewing the interior thereof, and handholes 15 which are sealed with an elastic diaphragm 16 having a glove configuration which permits a technician to reach into the box to handle its contents without exposing them to the atmosphere. To complete the glove box, a suitable, sealable entrance must be provided, such as a pivoted gate 17, located at one end of the box and provided with conventional sealing and locking devices, not shown. Other connective fittings can also be provided, such as those hereinafter described.

When a glove box G, such as that illustrated, is to be used with normal atmospheric pressure within it, it may be made of a comparatively lightweight construction, leakproof, but incapable of sustaining the forces created by causing a high vacuum or high pressure within it, and in any event, the extent of the unbalanced pressure is limited by the elastic glove diaphragms 16 which cover the handholes 15. This produces a difficult problem where it is essential that the box be absolutely air tight and leakproof and must be tested for leaks before it is used. It is to be noted that no container is absolutely leakproof, since some leakage rate, as by gas diffusion through the walls or gaskets, can be detected when subjected to a high enough vacuum. However, a leak rate sufficiently low that, for practical purposes, it will not be adverse to the use to which the container is put, can be tolerated. For instance, such a leak rate may be on the order of a leakage less than $10.0 \times 10^{-3}$ atmospheres cc./sec. Also, small leaks can be easily detected but the exact location may not be indicated, for they may be caused by a structural defect in the wall of the box, at a weld, or by undue porosity of the material used. However, a comparatively large leakage rate will normally be due to a misplaced or improperly fitted gasket or the like, so that this possibility can be checked and repaired, then the container tested again. It the leakage rate is in excess of that which can be tolerated, welds or the like may be checked, as by X-ray, although it is also contemplated that the vessel V may be sufficiently large to admit a workman in a pressure suit, for sniffer or probe testing when small leaks are to be located.

The present invention contemplates placing this glove box G within a rigid vessel V, as upon legs 18, to expose all surfaces of the box to the atmosphere within the vessel. This vessel V is necessarily built to withstand external atmospheric pressure when it is evacuated and may be formed in any desirable manner, such as being cylindrical or spherical, to do this. However, as illustrated, the vessel V is a box-like structure, normally not greatly larger than the largest glove box which might be placed within it, to minimize the amount of air which must be evacuated from it. So formed, the vessel V includes side walls 20, a top 21, a bottom 22 and end walls 23 and 24. The vessel also has suitable reinforcing ribs 25 across the plates forming these side, top, bottom and end walls. One end 23 may be permanently affixed in position, as by welding, with the opposite end 24 adapted to be removed for access into the vessel to permit the glove box to be placed therein and to permit certain conduit connections to be made, as hereinafter described. This removable end may be formed as a gate-like construction, or it may be a simple, flat plate reinforced by ribs 25 and held to a peripheral flange 26 at the edges of the side, top and bottom walls, as by cap screws 27, as illustrated. For sealing purposes, a suitable gasket (not shown) is placed in a conventional position between end 24 and flange 26, the material of the gasket depending on the degree of vacuum to be drawn inside vessel V. For a rough vacuum, i.e. down to one torr, many conventional gasket materials are suitable; for a fine vacuum, i.e. one torr to $10^{-3}$ torr, or a high vacuum, i.e. $10^{-3}$ to $10^{-6}$ torr, neoprene is usually a suitable gasket material; for a very high vacuum, i.e. $10^{-6}$ to $10^{-9}$ torr, a material known as Vyton is usually suitable; but for an ultra high vacuum, i.e. $10^{-9}$ torr and below, copper will usually be a suitable gasket material down to $10^{-11}$, while below $10^{-11}$ torr, such as $10^{-14}$ torr or perhaps $10^{-20}$ torr (now contemplated) gold may be required as the gasket material. The material of which the walls of vessel V may be constructed will also depend on the vacuum to be drawn. Thus, conventional low carbon steel may be used if the vacuum is not to exceed $10^{-5}$ torr, but because of what is termed "outgassing," i.e. volatilization of portions of the metal walls themselves at a greater vacuum, stainless steel should be used for a vacuum in excess of $10^{-5}$ torr. Similar considerations apply to the materials used for glove box G.

As indicated, the testing procedure includes the simultaneous evacuation of both the glove box G and the vessel V. When this step is completed, a small differential pressure between the outside and inside of the glove box, within the vessel, is produced by releasing helium gas or other detector fluid into the vessel and thereafter measuring any flow of helium gas from the exterior to the interior of the glove box by an instrument, such as a mass spectrometer, as will be further described. However, before describing these operations of measuring the vacuums produced and pressures and gas flow, the necessary apparatus and instrumentation of the vessel V and the glove box G will be described.

Several conduits must extend through the walls of the vessel V to the space within and, while a single conduit may serve several purposes, these conduits will include a vacuum pump line 30, a gage line 31, a manometer leg line 32 and a helium feed line 33. These conduits may be of any suitable size and their connection to the walls of the vessel V may be in any selected manner, such as by being fitted into flanges welded to the walls of the vessel. The vacuum line 30, which extends to a vacuum pump P, includes a normally closed bypass valve 34 and a suitable type of shut off valve 35. The gage line 31 extends to a vacuum dial gage 36 to permit an operator to obtain a quick, though not precise, indication of the vacuum within the vessel. The manometer leg line 32 extends to one leg of a manometer 37 which is used to measure small differential pressures between the inside of the vessel V and the inside of the glove box G, as will be further described. The helium feed line 33 extends to a pressure regulating valve and gage assembly 38 which is connected to a helium gas supply bottle 39. As will be evident, when a detector gas other than helium is to be used, an appropriate source of supply thereof may be substituted for the helium bottle 39.

To supplement the readings of the dial gage 36, and to provide an accurate reading of the pressure within the vessel when a complete vacuum is being approached, an electrical vacuum gage or other suitable type of gage, is desirable. For a vacuum down to $10^{-3}$ torr, a thermopile vacuum gage 40 may be connected to the space within the vessel V, as by a nipple connected to a pipe coupling 41 welded in a hole in a side wall of a vessel V, or in a plate 42, for a purpose described later. A suitable gage of this type is manufactured and is available from Hastings-Raydist, Inc. of Hampton, Va. For higher vacuums, other types of vacuum gages may be utilized, such as a cold cathode or Philips type for measurement to $10^{-7}$ torr, or a hot filament ionization gage for measurement to $2\times 10^{-9}$ torr, each being a type supplied by Consolidated Vacuum Corp. of Rochester, N.Y. For a vacuum in excess of $2\times 10^{-9}$ torr, suitable measuring instruments are also available. A plug 43 is connected to gage 40, while the electrical leads of a cable 44 are thereby connected between the gage and a readout meter M, which is properly calibrated for the purpose at hand, and this may be done in any suitable manner.

A similar array of conduits connect with the glove box G, to provide communication from the interior of the glove box to the exterior of the vessel V. Accordingly, these conduits or tubes must not only pass through the wall of the glove box G, but also through a wall of the vessel V. The conduits include a vacuum pump line 46 and a manometer leg lead 47. These conduits may be of any suitable size and the portion outside the vessel V may be connected to a wall of the vessel in any suitable manner, as into flanges welded to the wall of the vessel, as heretofore described. A different mode of extending the conduits from the interior wall of the vessel to a wall of the glove box is necessary, however, and a suitable mode of interconnection is illustrated in FIG. 2. There, a metal conduit 46 extends through and is welded to a flange 48, in turn welded to the side wall 20 of the vessel V, so that its inner end provides a short stub within the vessel. A similar tubular stub 49 upstands from a wall, such as the top wall 11 of the glove box, and a resilient tube 50 connects the stubs to complete the line. In a similar manner, the manometer leg lead 47 extends through the plate 42 on vessel wall 20 to provide a stub which is connected with a stub 51 upstanding from the glove box wall 11, as by a resilient tube 52. For a vacuum to $10^{-3}$ torr, tubes 50 and 52 may be formed of a plastic known as Tigon, while manometer leg lines 32 and 47 may be formed of the same material or of copper tubing. For a vacuum below $10^{-3}$ torr, tubes 50 and 52, as well as manometer tubes 32 and 47, may be formed of stainless steel. It will be noted that, when testing with helium, it is desirable to use plastic tubing for tubes 47 and 52, since rubber tends to adsorb helium, thus possibly producing inaccurate results.

The vacuum line 46, extending through the vessel V from glove box G, is provided with a normally closed bypass valve 53 and a shut-off valve 54, extending thence to a vacuum pump P'. A branch line 55 has a shut-off valve 56 and extends thence to a gas detecting device D, such as a mass spectrometer of the type manufactured by Consolidated Electro Dynamics of Monrovia, Calif. This unit is capable of detecting minute amounts of helium by ionization of the gas, and it includes a vacuum pump in the line, so that when it is in operation, any helium leaking into the glove box will be pumped therefrom and into the apparatus. The manometer leg line 47 extends from the vessel V and connects with the opposite leg of the manometer 37 to complete the manometer connections.

In order to more accurately measure the pressure inside the glove box, an electrical vacuum gage, such as a thermopile gage 60 of the type previously described, when the vacuum does not exceed $10^{-3}$ torr, but for which the other types of vacuum gages previously mentioned may be substituted, is connected to the inside of glove box G, in the manner described below, while electrical leads in a cable 61 connected to this gage 60 extend to a readout meter, which may be the same meter M heretofore described. Plate 42 is attached to wall 20 of vessel V over an opening in the latter, to permit substitution of desired types of vacuum gages and to permit the vacuum gages and manometer tubes to be connected at the same position. Plate 42 may be clamped by nuts on studs welded to wall 20 against a suitable gasket, as of the material discussed above in connection with end 24 of vessel V. As in FIG. 3, an interiorly threaded coupling 62 extends through a hole therefor in plate 42 and is welded to the plate, while a nipple 63 of the gage 60 is threaded into the coupling with a suitable sealing material. As will be evident, gage 40 is connected to the adjacent coupling 41 in a similar manner. A plug 64 connects the lead wires of cable 61 with the terminals of gage 60. A tube 65, of the same material as tube 52, may be connected to coupling 62 in a suitable manner, as by placement over the inwardly extending end of the coupling and clamped tightly by a conventional clamp 66. The opposite end of tube 65 is placed over and similarly clamped onto a stub tube 67 which extends through a wall of glove box G, such as top wall 11, and is welded thereto. The opposite ends of tube 50 of FIG. 2, as well as the opposite ends of tube 52, may be clamped in a similar manner. In the event a stainless steel tube is substituted for tubes 50, 52 and 65, clamping or threaded fittings of a suitable nature may be provided at opposite ends of these tubes.

Before placing the glove box G or other container to be tested in the vessel, the glove box should be thoroughly cleaned, in order to remove any material which might volatilize during the test and affect the readings obtained. Thus, several washings with a detergent, followed by drying, should be used, then rinsing with a solvent, such as alcohol, to remove any oil or other volatile substances.

After installing and checking out the apparatus, which includes checking the operation of the vacuum pumps P and P', the operation of the gas detector D and the read-out meter M, the manometer is charged with a suitable liquid, of a type which will not evaporate at low pressure, a petroleum type of oil known as vacuum diffusion pump oil being suitable for the purpose. The gage 60 may be checked by what is known as a "calibrated leak," in a conventional manner. After the gages and the lines within the vessel and to the glove box are checked out, the end of the vessel is closed and the test may proceed.

The first step is to simultaneously evacuate the container and the vessel which contains it, maintaining the differential of pressure within and without the container less than the pressure which would damage the container, in this instance, the glove box G. This operation may proceed by closing the line valve 56 to the gas detector D and starting the vacuum pumps P and P' with their respective line valves 35 and 54 closed. These valves 35 and 54 should be opened simultaneously and with care to prevent unbalanced pressures from occurring at the commencement of the operation and, if necessary, the bypass valves 34 and 53 may be used to keep this balance of pressure within safe limits. During the simultaneous evacuation of the vessel V and glove box G, this difference in pressure is indicated by the manometer 37, through which the glove box may be maintained at a pressure, for example, of not more than 3 inches of water less than the pressure within the vessel V. The pressure within this glove box G is conveniently maintained below the pressure within vessel V during the evacuation operation, so that ultimate evacuation of the glove box to the desired low pressure is more readily assured. Thus, it is necessary that the glove box ultimately reach a vacuum at which the test is to be conducted, whereas after evacuation, helium will be turned into the vessel V, outside the glove box and such a degree of vacuum is not absolutely necessary for the vessel V, although the latter is desirable in order to eliminate, as far as possible, all contaminants which might interfere with the accuracy of the test. Of course, as the pressure within the glove box and vessel approaches the desired vacuum, where the absolute pressure is less than 3 inches of water, for instance, such care is no longer necessary and the valves 35 and 54 may be opened wide. The evacuating process may then continue until the pressures outside the glove box within the vessel and inside the glove box are reduced to a desired level, as indicated by the gages 40 and 60, such as one millimeter of mercury or less.

Some time during this evacuation operation, the vacuum pump in the gas detector D is turned on, so that the apparatus is ready for a subsequent operative step, which consists in closing the shut-off valve 54 and opening the shut-off valve 56, so that the gas detector vacuum pump maintains the vacuum within the glove box, and the gas detector ionizing components may be turned on to indicate the possible presence of helium gas. In the event that the test is to be carried out at $10^{-9}$ torr or a greater vacuum, a diffusion vacuum pump may also be connected to the vacuum lines 30 and 46, or placed in tandem with the respective vacuum pumps, to achieve a greater degree of vacuum.

The next step is to determine the background or "noise" reading of the gas detector D, which should be subtracted from readings taken later. Then the operater should close the vessel vacuum line valve 35 and glove box vacuum line valve 54. Even after the valves 35 and 54 are closed, the vacuum pumps P and P' are continued in operation, to insure that no lubricant oil in either pump will be drawn back into line 30 or line 46, which will migrate back into the glove box compartment in the event, for any reason, valve 35 or valve 54 is again opened to connect the vacuum pumps again in the circuit. This precaution is particularly desirable for pump P'. After the valves 35 and 54 have been closed, the next step is to open the pressure regulating valve 38 of the helium gas bottle to admit helium into the vessel V outside the glove box. The flow of helium is permitted to continue until a selected pressure differential is noted upon the manometer, which need be only approximately two or three inches of water, then the flow of helium may be discontinued. Although the glove box walls and the glove diaphragms could probably withstand a larger pressure differential without being damaged, it was found that a pressure differential of only a few inches of water, and even as small as one inch of water as a lower limit, was, in the environment of a hard vacuum, sufficient to permit measurement of flow of helium gas from the vessel and into the glove box through any microscopic crack or defect, or through porous material, which would constitute a source of leakage.

The next step of the testing operation is to continue to observe the dial indicators of the mass spectrometer or other gas detector, or connect them with a recorder, for a selected time period, as of several hours and until the leak indication of the detector D becomes constant. This indicates that the pump of the detector is pumping out the test gas at as fast a rate as it is flowing into the inner container, such as the glove box G. This rate, less the background or "noise" reading, previously determined, is the leakage rate of the box. Thus, if this leakage rate is less than the maximum permissible, the container or box has passed the test. Of course, if presence of a comparatively large leak is indicated, in which event the gas detector will go "off scale," the test should be immediately discontinued, and the box removed and X-ray or other tests made to determine, if possible, the cause of the leak. If diffusion through the gasket material appears to be the cause of leakage, it may be necessary to substitute another material. Otherwise, all welds are examined, as by X-ray, halogen or other tests, until the cause of such a leak is found and the leak corrected.

The final operative step in the procedure consists in relieving the vacuum within the glove box G and the vessel V in such a manner as to prevent unbalanced pressures which would blow out the manometer fluid, rupture the glove diaparagms 16 or otherwise damage the container. This can be accomplished by closing the valve 56 and thereafter slowly opening the bypass valves 34 and 53 in such a manner as to permit a controlled inflow of air to both the vessel and glove box, maintained so that the manometer gage preferably indicates a substantially even pressure, until atmospheric pressure is reached.

As will be evident, when a test gas or vapor other than helium is utilized, the procedure will be essentially the same as described above. Of course, the gas detector D should be a type which is responsive to the test gas or vapor being used.

In order to test a thin sheet of material for permeability by the test gas, the container placed inside the vessel V may be similar to that shown in FIGS. 4 and 5. Thus, container C may be of any desired shape or size, being shown as box-shaped for illustrative purposes only. Container C has side walls 70, a bottom wall 71, end walls 72 and flange 73 extending inwardly around the upper edges of the side and end walls. One end wall 72 is provided with stubs 49 and 51 extending outwardly therefrom and communicating with the interior, for connection of vacuum pump tube 50 and manometer leg tube 52, respectively, as well as a stub 67 for vacuum gage tube 65, each leading to the same parts as shown in FIG. 1.

The opening provided by top flanges 73 is covered by a sheet 75 of the material to be tested, such as paper, plastic, metal foil, or other material. The thickness of the sheet 75 of the material to be tested, such as paper, plastic use, or may be thinner to increase the diffusion rate and reduce the length of time required for the test. Also, the exposed area of sheet 75 may be in units of square feet or inches, or square meters, so that the results may be more easily related to area. Sheet 75 is clamped against flanges 75 by a rectangular clamping ring 76, through tightening nuts on studs 77, or in any other suitable manner, with a suitable sealing gasket 78 between the sheet and flanges. Gasket 78 may be conveniently formed of the same material as sheet 75 or of other suitable material. In this connection, if the test is to be made for oxygen, the gasket should not be formed of any of the various plastics which are known to have a high oxygen diffusion rate. If the test is for diffusion of a volatilized metal, arrangements can be made to produce an electrical spark to volatilize the metal inside the vessel V, either controlled exteriorly or by an operator who is protected by a pressure suit and who remains in vessel V during the test.

When the container C of FIGS. 4 and 5 is substituted for the glove box G of FIG. 1, to test the diffusion rate of a detector gas or vapor through sheet 75, the procedure will be essentially the same as that previously described. Of course, for very thin sheets, it may be necessary to control the differential pressure, while simultaneously evacuating both vessel V and container C, within much narrower limits than when a glove box or plutonium rod container, for instance, is being tested. Thus an extremely thin sheet of material may be tested with a vacuum of, say, $10^{-9}$ torr, while the vacuum inside vessel V may be limited to $10^{-6}$ torr, with a corresponding closeness of the vacuum maintained during evacuation. Of course, accurate controls would be necessary for such purpose. When testing for the diffusion or leakage rate of water or other vapor, for instance, the vacuum inside vessel V may be utilized to vaporize a measured or measurable amount of water or other vaporizable liquid, merely by connecting the detector gas line 33 thereto, preferably through a control valve. The diffusion rate through the sheet 75 is determined by first substituting a thick plate corresponding in dimension to sheet 75 and preferably using the same gasket material, to determine the diffusion rate through the walls of the container and the gasket, so that upon testing the container provided with sheet 75, in the manner described previously, the diffusion rate through the sheet would equal the leakage rate through the container with the sheet less the leakage rate through the container with the thick plate substituted for the sheet.

The method of this invention may also be utilized in determining the outgassing or deterioration of material, particularly when subjected to a very high or ultra high vacuum, i.e. from $10^{-6}$ to $10^{-9}$ torr or $10^{-9}$ torr and below. The material to be tested may form the sheet 75 of FIGS. 4 and 5, or a greater portion of or even the entire inside container may be formed of the material to be tested. Also the detection device D, such as a mass spectrometer, may be used to detect a gas or vapor which is introduced into the vessel V or may be a product of the deterioration or degradation of the material itself, particularly when the material to be tested is nonmetallic, such as plastic material or synthetic rubber and the like. Thus, the space inside vessel V may be drawn down to $10^{-3}$ torr or lower, while the space inside container C or the equivalent may be drawn down to $10^{-9}$ torr or lower. Natural or synthetic rubber may be tested for the effect of water vapor thereon, the detection device D being used to measure the various molecules outgassing from the inside of sheet 75 as degradation products. The sheet 75 need not be subjected to a gas or vapor, but instead to radiation and the like, such as heat, ultraviolet or other light rays, gamma rays, neutrons, protons, electrical disturbances caused by sparks, flux, etc., or any other desired type of treatment, and the effect thereof tested, as for one or more "masses" (in terms of the mass spectrometer or similar instrument) which will normally involve a thin sheet of material which would be damaged by a differential pressure of an atmosphere or less. The vessel V and the container C are again evacuated at controlled rates, so that the differential in pressure is always less than that which would damage the test sheet or container. As will be evident, the condition to which the material to be tested is subjected may be imposed on either the inside or outside, or both, of the container C, while the space within vessel V or within container C, or both, may be connected to the detector D to ascertain the production of a degradation product of the material being tested or the pressure and amount of a detector gas or vapor introduced on the opposite side.

I have now described my invention in considerable detail. However, it is obvious that others skilled in the art can devise alternate and equivalent operations which are, nevertheless, within the spirit and scope of my invention.

What is claimed is:

1. A method for vacuum detection of leakage through the walls or a portion of a wall of a closed container said container walls or wall portion being susceptible to damage by a pressure differential between the inside and outside of said container corresponding to the degree of vacuum necessary to conduct such test, comprising the steps of:
    (a) placing said container within a closed vessel capable of withstanding atmospheric pressure outside the vessel and such a vacuum inside the vessel, to produce a confined space within the vessel outside the container and a second confined space within the container;
    (b) simultaneously evacuating both spaces to a selected vacuum while maintaining a predetermined pressure differential between the two spaces which is less than any pressure differential sufficinet to damage said container;
    (c) admitting a detector gas or vapor into one of the spaces to a pressure which is less than said damaging pressure differential; and
    (d) detecting the presence of any detector gas or vapor which may have leaked into the other space.

2. A method as defined in claim 1, wherein:
said detcetor gas is admitted into the vessel outside the container; and
the presence of any detector gas or vapor which may leak into the container is detected.

3. A method as defined in claim 1, wherein:
said evacuation from said container is to an absolute pressure of approximately one millimeter of mercury or less.

4. A method as defined in claim 1, wherein:
said predetermined pressure differential is on the order of two inches of water.

5. A method as defined in claim 2, wherein:
said evacuation from said container is to an absolute pressure of less than one millimeter of mercury; and
the detector gas is helium.

6. A method as defined in claim 1, including:
simultaneously relieving the vacuum within and without the container upon completion of the detecting step, while maintaining a pressure differntial between said spaces less than said damaging pressure.

7. A method as defined in claim 1, wherein:
one wall of said container has an opening provided with a sheet material to be tested for diffusion of gas or vapor therethrough; and
said sheet is sealed around its edges to said container.

8. A method as defined in claim 7, wherein:
the detector gas or vapor is admitted into said vessel outside said container; and
the amount of said gas or vapor passing into said container is determined for a predetermined period of time, in order to determine the diffusion rate of said gas or vapor through said material.

9. A method as defined in claim 1, wherein:
said evacuation from said container is to an absolute pressure which will cause substantially all gas, vapor or volatilizable material which would adversely affect the detection of the detector gas or vapor to be drawn out of the container.

10. A method for testing a selected material of the walls or a portion of a wall of a closed container, such containing or a wall portion thereof being susceptible to damage by a pressure differential between the inside and outside of said container corresponding to the degree of vacuum necessary to conduct such test, comprising the steps of:
 (a) placing said container within a closed vessel capable of withstanding atmospheric pressure outside the vessel and such a vacuum inside the vessel, to produce a confined space within the vessel outside the container and a second confined space within the container;
 (b) simultaneously evacuating both spaces to a selected vacuum while maintaining a predetermined pressure differential between the two spaces which is less than any pressure differential sufficient to damage said container;
 (c) subjecting said walls or wall portion formed of said selected material to predetermined conditions which may cause degradation or deterioration of such material; and
 (d) detecting the presence of a mass, in either or both of such spaces, present in such space as a result of such degradation or deterioration.

11. A method as defined in claim 10, wherein:
a mass so detected orignates from said material being tested.

12. A method as defined in claim 10, wherein:
said predetermined conditions include subjecting said material to be tested to a physical agent.

13. A method as defined in claim 12, wherein:
said predetermined conditions include subjecting said material to be tested to a gas or vapor.

References Cited

UNITED STATES PATENTS

| | | | |
|---|---|---|---|
| 2,486,199 | 10/1949 | Nier | 73—40.7 |
| 2,608,855 | 9/1952 | Jacobs | 73—40.7 |
| 2,784,373 | 3/1957 | Lawrence et al. | 73—49.3 XR |
| 3,177,672 | 4/1965 | Seelandt. | |
| 3,224,277 | 12/1965 | Chamberlin et al. | 73—432 |

S. CLEMENT SWISHER, Primary Examiner

UNITED STATES PATENT OFFICE
CERTIFICATE OF CORRECTION

Patent No. 3,487,677 January 6, 1970

Victor D. Molitor

It is certified that error appears in the above identified patent and that said Letters Patent are hereby corrected as shown below:

Column 1, line 47, "contnainer" should read -- container --. Column 2, line 71, "of", third occurrence, should read -- or --. Column 3, line 50, before "certain" cancel "a"; line 65, "one" should read -- on --. Column 9, line 15, "of the material to be tested, such as paper, plas-" should read -- is selected to correspond with that of the proposed --; line 46, "vacuum" should read -- vacuums --. Column 10, line 48, "sufficinet" should read -- sufficient --; line 57, "detcetor" should read -- detector --. Column 11, line 23, "containing" should read -- container --.

Signed and sealed this 10th day of November 1970.

(SEAL)
Attest:

EDWARD M. FLETCHER, JR.  WILLIAM E. SCHUYLER, JR.
Attesting Officer  Commissioner of Patents